(No Model.)

M. S. TRACY.
CULINARY VESSEL.

No. 517,673.   Patented Apr. 3, 1894.

Witnesses.
Edward W. Bush,
J. B. Morgan

Inventor.
Milton S. Tracy,
By James Shepard.
Atty.

UNITED STATES PATENT OFFICE.

MILTON S. TRACY, OF GLASTONBURY, CONNECTICUT.

CULINARY VESSEL.

SPECIFICATION forming part of Letters Patent No. 517,673, dated April 3, 1894.

Application filed January 24, 1893. Serial No. 459,541. (No model.)

*To all whom it may concern:*

Be it known that I, MILTON S. TRACY, a citizen of the United States, residing at Glastonbury, in the county of Hartford and State of Connecticut, have invented certain new and useful Improvements in Culinary Vessels, of which the following is a specification.

My invention relates to improvements in culinary vessels, in the form of either frying-pans or kettles, and the chief object of my improvement is general convenience and efficiency.

Figure 1:
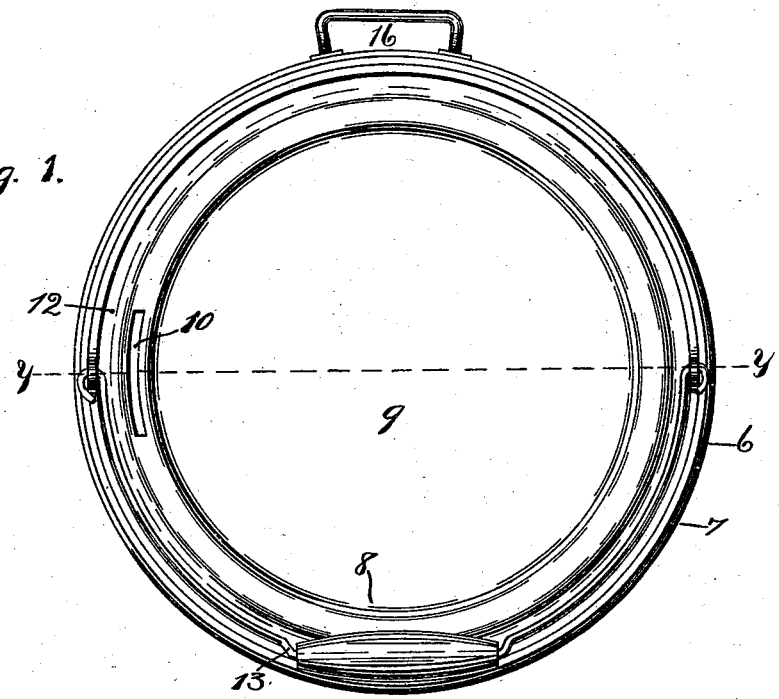
Figure 2:
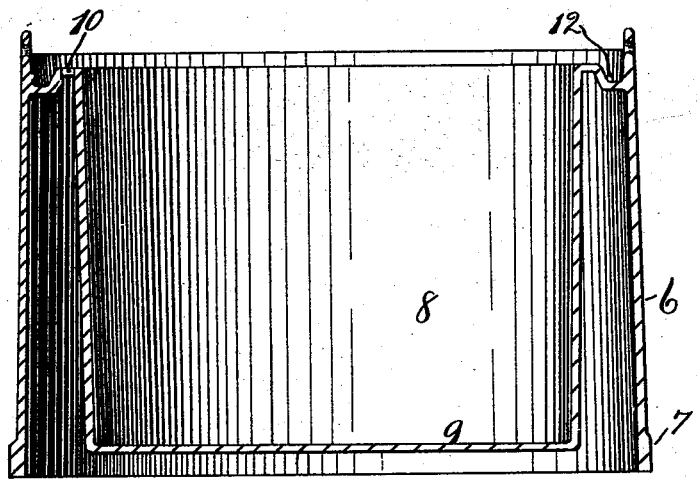

In the accompanying drawings, Figure 1 is a plan view of a culinary vessel containing my improvement. Fig. 2 is a vertical section of the same, on the line $y\,y$ of Fig. 1.

The outer wall 6 of my culinary vessel either in a frying-pan or kettle, extends from the rim 7, at the base, upwardly to the top or upper edge. The vessel proper 8, is inside of this outer wall and its side wall extends from, at or near, the upper edge of said outer wall downwardly to the bottom 9, said bottom being somewhat above the base of the rim. This construction forms an annular chamber around the entire vessel proper, and by making the bottom 9, a little above the base of the rim, there is always a hot air space underneath the bottom of the vessel which communicates with the annular hot air chamber at the sides thereof. Such a vessel may be set upon the top of the stove, either with or without removing a stove lid, and the heat will be evenly and thoroughly distributed over the bottom and sides of the vessel. I also provide a water channel 12 and a vent 10, near the top of the vessel, which opens into the annular air space or chamber surrounding the sides, whereby the vessel may be placed over a hole in the top of the stove and the gases from the vessel will pass down through said vent and chamber into the stove, the vessel, of course, being provided with a suitable cover.

I form the water channel 12, at the junction of the outer wall and vessel proper, to receive the edge of the cover and form a water seal. This water channel of itself is not of my invention, but by my improvements in connection therewith I am enabled to locate the vent 10 on an elevated rim between the sides of the vessel proper and water channel while at the same time the vent opens into the annular channel. It is of course evident that more than one vent may be employed if desired either in the frying pan or kettle. I provide the kettle with a bail 13 of any ordinary construction and a side handle 16 which handle may be secured by rivets through the outer wall 6 as shown at 15, Fig. 2. By the employment of the annular chamber, the handle or other attachment which it may be desired to place on the vessel or pan, can be riveted to the outer wall, thereby leaving the inside of the vessel proper, perfectly smooth and capable of a neat finish. By the employment of the annular chamber and bottom space which inclose the vessel proper, I not only heat the vessel evenly, but I better protect the contents of the vessel and make it less liable to sudden chills when it is set one side and allowed to stand for a time.

I claim as my invention—

A culinary vessel consisting of the vessel proper with the annular air space and outer wall surrounding said vessel, the water channel 12 outside of and slightly below the upper edge of said vessel proper and the vent located on the elevated rim between said water channel and interior of said vessel, substantially as described and for the purpose specified.

MILTON S. TRACY.

Witnesses:
M. W. CRANE,
C. E. WEBB.